Patented Dec. 16, 1924.

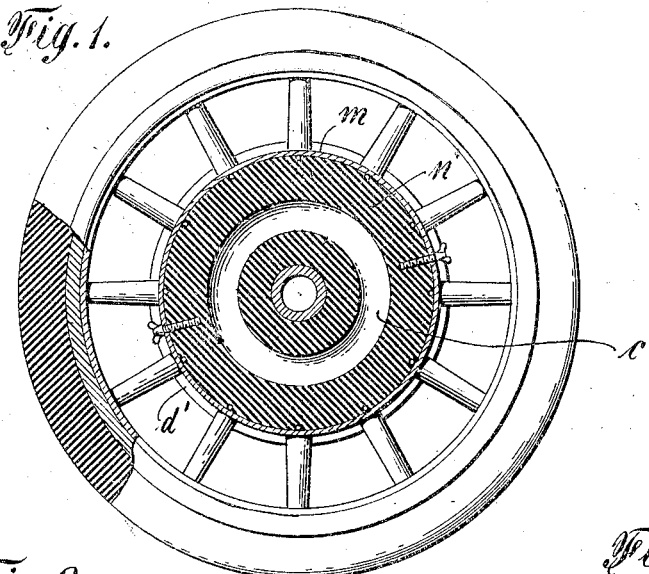

1,519,630

UNITED STATES PATENT OFFICE.

ANTONIO ROMAÑACH, OF BUENOS AIRES, ARGENTINA.

WHEEL.

Application filed March 17, 1921. Serial No. 452,974.

*To all whom it may concern:*

Be it known that I, ANTONIO ROMAÑACH, citizen of the Republic of Argentina, residing at 1312 Lavalle Street, Buenos Aires, Republic of Argentina, have invented certain new and useful Improvements in Wheels, of which the following is a specification.

My invention relates to an improved wheel for vehicles generally, but has more particular reference to wheels designed for use in connection with motor cars and the like.

The improved wheel constructed in accordance with this invention has mainly been devised for the purpose of replacing the pneumatic tyres by a tyre of solid rubber or other equivalent material. This object I attain by providing at the centre of such wheels a special means adapted to afford the vehicle the necessary resiliency, formerly provided by the pneumatic tyre, but without the drawbacks caused by the wear, perforation or puncture of this latter.

This particular means consists in a circular or disk-shaped body of rubber and fabric, suitably vulcanized, of a diameter varying from 0.20 to 0.50 m. and a thickness of 0.05 m. to 0.25 m., approximately, which body is placed at the centre of the wheel, around the axle or bushing, and which may either be made entirely solid or formed with a suitable circular cavity to constitute an air chamber, in case where an increased degree of resiliency is required.

On these resilient disks, one of which is mounted within each wheel and whose diameter and thickness will always be determined by the load and the strain to be resisted by the wheel, is supported the whole vehicle. Said rubber disks act as cushion tyres and in supporting the weight of the vehicle provide for the required degree of resiliency.

In the accompanying drawing in which I have illustrated my invention by way of example, Fig. 1 is a side elevation partly in section of a wheel made in accordance with my invention; Fig. 2 is a perspective view of the resilent body; Fig. 3 is a similar view as Fig. 2 showing a portion of the resilient body removed; Fig. 4 is a section through the hub portion of the wheel and Fig. 5 a fragmental perspective view of a modification.

At the centre of the wheel, concentric with the axle, is mounted a cylindrical metal casing, *m*, Figure 1. The disk or body *n* of resilient material, shown in Figure 2, is arranged with said cylindrical casing *m* closed on the sides by the disks *d'* and is conveniently secured in position by means of screws, clamps or grooves, as indicated in Figure 3.

The air chamber *c* (Figures 1 and 4) is formed by a circular cavity, situated in the center of the disk and the diameter of said air chamber will preferably be rather small, in order to not unduly weaken the rubber disk.

To the metal cylinder *m* are secured, so as to form a casing therewith, the metal disks or plates *d* and *e*, and on the bushing or axle which passes centrally through the cylinder *m* are mounted the disks *f* and *g*, parallel to the former ones, whereby the whole structure is rigidly secured against axial displacement. As will be seen from Fig. 4, a free space is provided on either side of the elastic cushion *n*.

As will be seen by referring to Figure 5, the cylindrical casing *m* and the bushing may laterally and alternately be provided with resilient steel studs or pivots *o*, for the purpose of absorbing, at high speeds, the strains caused by the inertia of the vehicle on the rubber disk at sudden stops.

When the vehicle is started, the natural succession of shocks and rising and descending movements of the axle and body are transmitted to the rubber disk which absorbs or dampens the shocks. These movements are shared in by the metal discs, respectively secured to the axle and the casing, as by welding so as to always remain in contact with each other, owing to which arrangement said parts will move relative to each other with a smooth frictional motion which assists in absorbing or dampening the shocks, in particular when these latter are of a violent nature.

I claim as my invention:

A vehicle wheel comprising a cylindrical casing open at both ends, a single round elastic member in said casing having an annular air chamber, a bushing passing through the center of said casing and of said elastic member, discs secured to said bushing, one on either side of said elastic member and spaced therefrom, discs secured to the inner wall of said casing in contact with the said first discs and capable of radial movements relative thereto, and discs closing the open ends of said casing.

In testimony whereof I have hereunto set my hand.

ANTONIO ROMAÑACH.